JACOB B. GOLDSMITH.
Improvement in Mechanism for Disengaging Horses from Whiffletrees.
No. 127,760.                              Patented June 11, 1872.
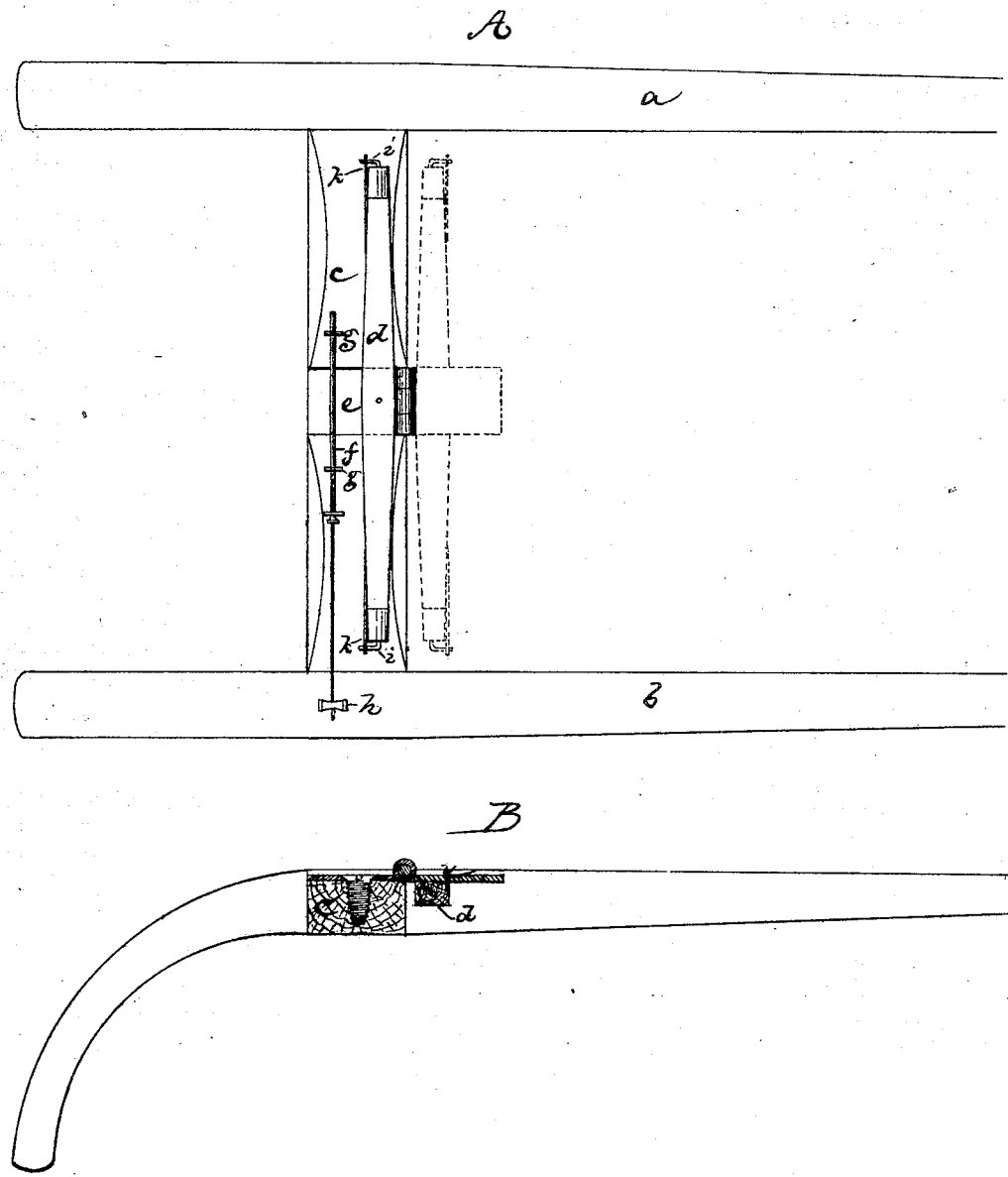
Witnesses.
M. W. Frothingham.
L. H. Latimer.
Inventor.
Jacob B. Goldsmith.
By his Attys.
Crosby & Gould 127,760

UNITED STATES PATENT OFFICE.

JACOB B. GOLDSMITH, OF ROCKPORT, MASSACHUSETTS.

IMPROVEMENT IN MECHANISMS FOR DISENGAGING HORSES FROM WHIFFLETREES.

Specification forming part of Letters Patent No. 127,760, dated June 11, 1872.

*To all whom it may concern:*

Be it known that I, JACOB B. GOLDSMITH, of Rockport, in the county of Essex and State of Massachusetts, have invented an Improved Mechanism for Disengaging Carriage-Shafts; and I do hereby declare that the following, taken in connection with the drawing which accompanies and forms part of this specification, is a description of my invention sufficient to enable those skilled in the art to practice it.

The invention relates to such an arrangement of the whiffletree of a carriage as shall enable it to be operated from the carriage in such manner as to insure the disconnection of the traces, when desirable, for which purpose I fasten the whiffletree to a plate which is hinged to the cross-bar of the shafts, the plate being fastened in position by a slide-bolt passing over it and through eyebolts, and locking the plate down to the bar, the traces hooking over hooks at the ends of the whiffletrees —being retained by springs—and the slide-bolt being fastened to a line running to the inside of the carriage, so that by a sharp pull upon the line the bolt may be withdrawn. When the carriage is being drawn, if the horse runs away the bolt is thus withdrawn and the strain upon the whiffletree will then reverse the position of the whiffletree-plate and whiffletree, and the traces will then disconnect from the whiffletree, freeing the running horse from the carriage. It is in this construction of the disengaging mechanism that my invention consists.

The drawing represents a pair of shafts, a whiffletree, and disengaging mechanism embodying my invention.

A shows a plan of the shafts. B is a central vertical section.

*a b* denote the two shafts, connected by a bar, *c. d* denotes the whiffletree, fastened to the plate *e*. This plate is hinged to the front edge of the bar *c*, and lies flat upon the bar, being held thereto by the slide bolt *f*, which passes over the plate and through eyes of eye-bolts or staples *g*, the slide bolt being attached at one end to a line whose opposite end is within the carriage, the line passing through a suitable guide, *h*.

When the parts are thus connected the whiffletree is in position to securely hold the traces, which are fastened upon the hooks *i*, and are kept from slipping therefrom by springs *k*. When the bolt is withdrawn the strain upon the whiffletree carries it into the position shown at B and by the dotted lines at A, and the traces will then draw off from the whiffletree-hooks, the springs yielding to let them pass. By these means it may always be in the power of a driver to disconnect the shafts and horse when the horse is running away and cannot be held.

The device is simple, reliable, and inexpensive.

I claim—

The reversing whiffletree, fastened to the plate *e*, which plate *e* is hinged to the bar *c*, and is fastened by a slide-bolt, *f*, substantially as shown and described.

JACOB B. GOLDSMITH.

Witnesses:
FRANCIS GOULD,
M. W. FROTHINGHAM.